United States Patent Office 3,351,621
Patented Nov. 7, 1967

3,351,621
COPOLYMERIZATION WITH α,ω-DIENES
Robert Bacskai, Berkeley, Calif., assignor to Chevron Research Company, a corporation of Delaware
No Drawing. Filed Feb. 6, 1964, Ser. No. 343,108
3 Claims. (Cl. 260—88.2)

This invention concerns a method of improving the physical properties of polypropylene. More particularly, this invention concerns a method of improving the physical properties of polypropylene by copolymerizing polypropylene with an α,ω-diene.

Polypropylene finds a wide variety of applications. It is used in films, fibers and molded objects. However, for many uses it is preferable to have a polymer having a lower brittle point than polypropylene and one that will retain its strength above the relatively low melting point of isotactic polypropylene, i.e., 160° C.

It has now been found that isotactic polypropylene can be prepared having a lower brittle point and capable of retaining a significant portion of its room temperature strength above its melting point, by copolymerizing propylene with an α,ω-diene of at least 6 carbons using "Ziegler-type" catalysts, thus incorporating a small percent of the α,ω-diene in the polypropylene. About 0.01 to 0.5 gram of the diene is added initially per gram of polymer obtained. Usually, the diene is incorporated with one or both of the olefinic linkages in the polymeric chain.

The α,ω-dienes are those of from about 6 to 12 carbons, preferably of from about 8 to 10 carbons. They are not branched nearer than beta to the olefinic carbon and are preferably straight chain. Illustrative of the α,ω-dienes are 1,5-hexadiene, 1,6-heptadiene, 1,7-octadiene, 1,8-nonadiene, 1,9-decadiene, 1,10,1-decadiene, 1,11-dodecadiene, 4-methyl-1,7-hexadiene etc.

In order to obtain the improved strength characteristics for polypropylene at least 0.1 mol percent of the diene should be introduced into the polymer. Depending upon the particular diene and the conditions of polymerization, as already indicated, varying amounts of diene will be added to the polymerization reactor to introduce the desired amount of diene in the polymer. Usually about 0.1 to 10 weight percent of the polymer will be the α,ω-diene. Of this, about 20 to 80 weight percent of the incorporated α,ω-diene will have a free double bond, while the remainder will either act as a cross-linking agent or be incorporated in a single chain.

The polypropylene α,ω-diene copolymers have melt flow rates of at least 0.01 ($N_2$, 230° C, 29,680 g.) and usually of at least 1.0. The brittle point is less than 15° C. and usually in the range −5 to +10° C. Penetration, as measured with a penetrometer, will be less than 75% at 400° F., as compared to 95% for isotactic polypropylene.

The copolymerization follows the usual procedure for "Ziegler-type" polymerization of α-olefins, particularly propylene. The preferred catalyst is a combination of titanium trichloride and trialkyl aluminum or dialkyl aluminum halide. That is, $R_nAlX_{3-n}$, where $n$ is a cardinal number varying from 2 to 3. R will usually be an alkyl group of from 1 to 6 carbons, and preferably ethyl or methyl, i.e., an alkyl group of from 1 to 2 carbons. X will generally be chlorine or bromine, preferably chlorine, i.e., halogen of atomic number 17 to 35.

The solvent used for the system will generally be a hydrocarbon, preferably an aliphatic hydrocarbon, of from 6 to 10 carbons. More usually, heptane will be the solvent.

The amount of the catalyst used is well known in the art and does not require extensive exemplification. Usually, the mol ratio of the aluminum compound to the titanium trichloride will be in the range of about 0.5:1 to 5:1. The catalyst concentration in moles of titanium per liter will generally be in the range of about 0.001 to 0.1. The pressure of propylene will also vary widely but is conveniently in the range of about 25 to 500 p.s.i.

The copolymerization is simply carried out by mixing together the desired diene, solvent, alkyl aluminum compound and titanium trichloride in a reaction vessel and then pressurizing the vessel with propylene. The reaction mixture may then be heated to the desired temperature which will usually be in the range of about room temperature to 100° C., preferably in the range of about 30 to 75° C.

The following examples are offered by way of illustration and not by way of limitation.

Example 1

Into a reaction vessel was introduced 100 ml. of dry heptane, 0.4 ml. of 50% diethyl aluminum chloride, 0.2 gram of $TiCl_3AA$, and 0.74 gram of 1,7-octadiene. The vessel was pressurized to 50 p.s.i. propylene and maintained at that pressure for a period of 2 hours at about 70° C. At the end of the reaction, the propylene was removed, methanol added to remove the catalyst, and the polymer isolated, yielding 15.23 grams of polymer. The polymer showed only 66% penetration at 400° F. when tested with a penetrometer, as compared to 95% of polypropylene.

From the polymer, 0.125 inch plugs were molded. These were placed in the penetrometer under a plunger weighing 393 grams. The temperature of the penetrometer oil bath was raised at a rate of 20° C. per 8 minutes. The degree of penetration of the plunger into the polymer was recorded as a function of the bath temperature.

Example 2

The copolymerization was carried out as described in Example 1, except that 1.47 grams of octadiene was added initially. A yield of 10.35 grams of polymer was obtained. The product showed only 40% penetration at 400° F.

Example 3

The copolymerization was carried out as described in Example 1, except that 3.68 grams of 1,7-octadiene were added initially. A yield of 7.42 grams of polymer was obtained. The product showed only 20% penetration at 400° F.

Example 4

Into a reaction vessel was introduced 500 ml. of heptane, 2 ml. of 50% diethyl aluminum chloride, 1 gram of $TiCl_3AA$, 5 ml. of 1,7-octadiene, and the vessel pressurized to 50 p.s.i. with propylene and heated to 70° C. The polymerization was continued for 2 hours at which time the propylene was vented and the heating removed. Methanol was added to kill the catalyst and the polymeric product further worked up with methanol to remove any residual metals. A polymeric product of 101.75 grams was obtained which was insoluble in hot decalin.

Example 5

The method used in Example 4 was repeated, except that 10 ml. of 1,7-octadiene was added initially. A yield of 86.01 grams of polymer insoluble in hot decalin was obtained.

The infrared spectrum of the polymers showed the presence of olefinic linkages in the polymer in every case.

Physical property measurements were carried out on stabilized Minijected specimens. Stabilization was obtained by ½ weight percent of 2,6-ditertiarybutyl para-cresol and ½ weight percent dilaurylthio dipropionate. The following table summarizes the results and compares commerical propylene.

TABLE I

|  | Example 4 | Example 5 | Polypropylene |
|---|---|---|---|
| Melt Flow Rate ($N_2$, 230° C.), g | 5.0 | 3.0 | 3.1 |
| Tensile Strength (Undrawn)— Temperature, 70° F., Speed, 1 in./min.: | 29,680 | 29,680 | 2,160 |
| Modulus, p.s.i | 96,000 | 125,000 | 103,000 |
| Yield Point, p.s.i | 3,370 | 3,270 | 3,360 |
| Extension to Break, percent | 1,400+ | 1,400+ | 1,400+ |
| Tensile Strength (Drawn)— Draw Ratio (Temp., 150° C.) | 6.4/1 | 5.1/1 | 8/1 |
| Temperature, 70° F., Speed, 1 in./min.: |  |  |  |
| Ultimate Break Strength, p.s.i | 29,100 | 22,800 | 31,900 |
| Extension at Break, percent | 89 | 189 | 36 |
| Brittle Point, ° C | 0 | +6 | +26.5 |
| Impact Tensile, ft.-lb./in.² | 125.3 | 108 | 80 |

It is evident from the table that the copolymers have significantly improved impact resistance and brittle point compared to polypropylene itself. Moreover, the polymers are readily molded because they have sufficient fluidity at elevated temperatures while still retaining a significant portion of their strength when heated above the melting point of polypropylene.

As will be evident to those skilled in the art, various modifications on this process can be made or followed, in the light of the foregoing disclosure and discussion, without departing from the spirit or scope of the disclosure or from the scope of the following claims.

I claim:
1. Product prepared by copolymerizing propylene and an $\alpha,\omega$-diene of about 6 to 12 carbon atoms with a Ziegler-type catalyst comprising titanium trichloride and an aluminum compound of the formula:

$$R_nAlX_{3-n}$$

where $n$ is a cardinal number varying from 2 to 3, R is alkyl of 1 to 6 carbon atoms and X is halogen of atomic number 17 to 35, the mol ratio of the aluminum compound to titanium trichloride being in the range of about 0.5:1 to 5:1, the amount of said $\alpha,\omega$-diene being sufficient to give the product an $\alpha,\omega$-diene content of about 0.1 to 10 weight percent, said product having a brittle point less than 15° C. and less than 75% penetration at 400° F.

2. The product of claim 1 wherein the $\alpha,\omega$-diene is 1,7-octadiene.

3. Product of claim 1 wherein the $\alpha,\omega$-diene has 8 to 10 carbon atoms.

References Cited

UNITED STATES PATENTS 2,933,480  4/1960  Gresham et al. _____ 260—80.5
3,190,862  6/1965  Boghetich _____ 260—88.2

FOREIGN PATENTS 632,633  11/1963  Belgium.
776,326  6/1957  Great Britain.

JOSEPH L. SCHOFER, Primary Examiner.

M. KURTZMAN, Assistant Examiner.